United States Patent
Matsumoto et al.

(10) Patent No.: US 6,982,294 B2
(45) Date of Patent: Jan. 3, 2006

(54) FLAME RETARDANT AND FLAME-RETARDANT RESIN COMPOSITION

(75) Inventors: Kazuaki Matsumoto, Osaka (JP); Yoshitaka Ono, Osaka (JP); Tatsushi Yoshida, Hyogo (JP)

(73) Assignee: Kaneka Corporation, Osaka (JP)

( * ) Notice: Subject to any disclaimer, the term of this patent is extended or adjusted under 35 U.S.C. 154(b) by 592 days.

(21) Appl. No.: 10/031,210

(22) PCT Filed: May 11, 2001

(86) PCT No.: PCT/JP01/03939

§ 371 (c)(1),
(2), (4) Date: Jun. 3, 2002

(87) PCT Pub. No.: WO01/85870

PCT Pub. Date: Nov. 15, 2001

(65) Prior Publication Data

US 2003/0130387 A1    Jul. 10, 2003

(30) Foreign Application Priority Data

May 11, 2000    (JP)    ............................... 2000-138974

(51) Int. Cl.
*C08K 5/5419*    (2006.01)

(52) U.S. Cl. .................. 524/267; 525/464; 528/43

(58) Field of Classification Search .................. 528/43; 524/267–268; 525/464

See application file for complete search history.

(56) References Cited

U.S. PATENT DOCUMENTS

| | | | | |
|---|---|---|---|---|
| 4,387,196 A | * | 6/1983 | Bonnet et al. | ............... 525/477 |
| 5,169,920 A | * | 12/1992 | Okawa | ........................ 528/34 |
| 5,604,039 A | * | 2/1997 | Chen et al. | ................. 428/447 |
| 6,790,887 B1 | * | 9/2004 | Nishihara | ................... 524/120 |

FOREIGN PATENT DOCUMENTS

| | | |
|---|---|---|
| JP | 10-139964 | 5/1998 |
| JP | 2001-40219 | 2/2001 |
| JP | 2001-152004 | 6/2001 |

* cited by examiner

*Primary Examiner*—Peter Szekely
(74) *Attorney, Agent, or Firm*—Brinks Hofer Gilson & Lione

(57) ABSTRACT

The present invention provides flame retardants which can provide high flame retardancy by means of silicon compounds.

A flame retardant comprising an aromatic group-containing organosiloxane compound wherein said compound has the following mean composition formula (1), does not flow at 23° C., flows at 200° C., does not gelate when heated at 200° C. with stirring for 30 minutes, has a number average molecular weight of not less than 2,000 and at the same time, dissolves not less than 100 g in 1 L of a solvent toluene at 23° C.:

$$R^1_m R^2_n SiO_{(4-m-n)/2} \qquad (1)$$

in the formula, $R^1$ represents a univalent aliphatic hydrocarbon group containing 1 to 4 carbon atoms; $R^2$ represents a univalent aromatic hydrocarbon group containing 6 to 24 carbon atoms; $R^1$ and $R^2$ each may contain two or more species; and m and n are numbers satisfying $1.1 \leq m+n \leq 1.7$ and $0.4 \leq n/m \leq 2.5$.

4 Claims, 2 Drawing Sheets

1 μm

1 μm

1 μm

1 μm

FLAME RETARDANT AND FLAME-RETARDANT RESIN COMPOSITION

RELATED APPLICATIONS

This application is a nationalization of PCT application PCT/JP01/03939 filed May 11, 2001. This application claims priority from the PCT application and Japan Application Serial No. 2000-138974 filed May 11, 2000.

TECHNICAL FIELD

The present invention relates to a flame retardant comprising an organosiloxane compound having a specific composition and a flame retardant resin composition rendered flame retardancy by that flame retardant.

BACKGROUND ART

Flame retardant resin compositions are utilized in various fields, such as electric and electronic fields and building material fields, for ensuring the safety from fire. In these resin compositions, halogen compounds, such as chlorine compounds or bromine compounds, have generally been used as flame retardants. In view of the recent increasing concern about environmental problems in European and other countries, various investigations have been made about the use of phosphorus-containing flame retardants and other halogen-free flame retardants.

However, when phosphorus-containing flame retardants such as phosphate ester compounds, red phosphorus and the like are used for attaining flame retardancy, there have been problems such that odors may emanate in the extrusion or molding step and the mechanical characteristics and thermal characteristics may be adversely affected. Therefore, various materials have been tested in search of flame retardants capable of taking the place of halogen compounds and phosphorus compounds.

Silicone compounds are known as halogen-free, phosphorus-free flame retardants. Thus, Japanese Kokai Publication Sho-54-36365 discloses a resin composition comprising a non-silicone polymer rendered flame retardancy with a silsesquioxane mainly comprising T units, and Japanese Kokai Publication Hei-10-139964 discloses a resin composition comprising an aromatic ring-containing non-silicone resin rendered flame retardancy with a silicone resin having T and D units.

However, in the silsesquioxane resin disclosed in Japanese Kokai Publication Sho-54-36365, an expensive silsesquioxane resin is required to be added in a large amount for attaining flame retardancy, hence it is impractical. The silicone resin described in Japanese Kokai Publication Hei-10-139964 is effective for polycarbonates but has little effect in rendering other resins flame retardancy, hence cannot provide them with a sufficient level of flame retardancy.

SUMMARY OF INVENTION

The present inventors made various investigations on silicone compounds having various compositions and, as a result, succeeded in synthesizing silicone compounds highly effective in attaining flame retardancy at low addition levels by strictly controlling the composition of the silicone compound to be used as a flame retardant and they have now completed the present invention.

Thus, the present invention is concerned with a flame retardant comprising an aromatic group-containing organosiloxane compound wherein said compound has the following mean composition formula (1),
does not flow at 23° C.,
flows at 200° C.,
does not gelate when heated at 200° C. with stirring for 30 minutes, and
has a number average molecular weight of not less than 2,000 and at the same time, dissolves not less than 100 g in 1 L of a solvent toluene at 23° C., as well as a flame retardant resin composition
comprising 0.2 to 20 parts by weight of the above flame retardant (A) relative to 100 parts by weight of a resin (B) having an oxygen or sulfur atom and an aromatic ring within the molecule thereof:

$$R^1{}_m R^2{}_n SiO_{(4-m-n)/2} \tag{1}$$

in the formula, $R^1$ represents a univalent aliphatic hydrocarbon group containing 1 to 4 carbon atoms and $R^2$ represents a univalent aromatic hydrocarbon group containing 6 to 24 carbon atoms. $R^1$ and $R^2$ each may contain two or more species. m and n are numbers satisfying $1.1 \leq m+n \leq 1.7$ and $0.4 \leq n/m \leq 2.5$.

DETAILED DISCLOSURE OF THE INVENTION

In the following, the present invention is described in detail.

The flame retardant of the invention comprises an aromatic group-containing organosiloxane compound. The aromatic ring-containing organosiloxane compound is a polymer formed from at least one of the four constituent units, namely the Q unit ($SiO_2$), T unit ($RSiO_{1.5}$), D unit ($R_2SiO$) and M unit ($R_3SiO_{0.5}$), wherein R represents an aromatic hydrocarbon group and/or an aliphatic hydrocarbon group.

The aromatic group-containing organosiloxane compound according to the present invention satisfies all the following requirements (1) to (5).

(1) It has the following mean composition formula (1):

$$R^1{}_m R^2{}_n SiO_{(4-m-n)/2} \tag{1}$$

in the formula, $R^1$ represents a univalent aliphatic hydrocarbon group containing 1 to 4 carbon atoms and $R^2$ represents a univalent aromatic hydrocarbon group containing 6 to 24 carbon atoms. $R^1$ and $R^2$ each may contain two or more species. m and n are numbers satisfying $1.1 \leq m+n < 1.7$ and $0.4 \leq n/m \leq 2.5$.

(2) It does not flow at 23° C.
(3) It flows at 200° C.
(4) It does not gelate when heated at 200° C. with stirring for 30 minutes.
(5) It has a number average molecular weight of not less than 2,000 and at the same time, dissolves not less than 100 g in 1 liter of toluene at 23° C.

In the following, these are described one by one.

(1) That "it has the mean composition formula (1)" means that the aromatic group-containing organosiloxane compound meets the following requirements. Thus, it has both the univalent aliphatic hydrocarbon group $R^1$ containing 1 to 4 carbon atoms and the univalent aromatic hydrocarbon group $R^2$ containing 6 to 24 carbon atoms within the molecule thereof, that the mole ratio m+n between all these hydrocarbon groups and the number of Si atoms is within the range of $1.1 \leq m+n \leq 1.7$ and that the mole ratio n/m between the univalent aliphatic hydrocarbon group $R^1$ containing 1 to 4 carbon atoms and the univalent aromatic hydrocarbon group $R^2$ containing 6 to 24 carbon atoms is within the range of $0.4 \leq n/m \leq 2.5$. The proportions of each element and each hydrocarbon group are calculated based on the NMR for hydrogen, carbon and silicon.

The univalent aliphatic hydrocarbon group $R^1$ containing 1 to 4 carbon atoms is not particularly restricted but there may be specifically mentioned, for example, methyl, ethyl, n-propyl, isopropyl, n-butyl, sec-butyl, tert-butyl and like groups. Among these, methyl and ethyl groups are preferred because of good flame retardant effects, and methyl group is more preferred. The plurality of $R^1$ may be all the same or may contain different groups. When the number of carbon atoms in the aliphatic hydrocarbon group is 5 or more, the flame retardant effects of the aromatic group-containing organosiloxane compound itself decrease, hence the flame retardant effects decrease.

The univalent aromatic hydrocarbon group $R^2$ containing 6 to 24 carbon atoms is not particularly restricted but there may be specifically mentioned, for example, phenyl, methylphenyl, dimethylphenyl, ethylphenyl, naphthyl, anthracenyl and like groups. Among these, aromatic groups having no substituent on the aromatic ring are preferred because of good flame retardant effects. Phenyl group is more preferred. The plurality of $R^2$ may be all the same or may contain different groups.

The mole ratio m+n between all the hydrocarbon groups and the number of Si atom is within the range of $1.1 \leq m+n \leq 1.7$. The value of m+n is preferably within the range of $1.15 \leq m+n \leq 1.65$, more preferably $1.18 \leq m+n \leq 1.6$, still more preferably $1.20 \leq m+n \leq 1.55$. A value of m+n which is less than 1.1 or more than 1.7 is not preferable since the flame retardant effect of the aromatic group-containing organosiloxane compound decreases.

For the aromatic group-containing organosiloxane compound according to the present invention to meet the above requirements (2) to (5), it is generally necessary that the compound contain a considerable proportion of the M unit within the molecule thereof. Therefore, for obtaining a composition satisfying the relation $1.1 \leq m+n \leq 1.7$, a structure mainly comprising the T unit in addition to the M unit is preferred. In cases where the D unit occurs, it is possible to obtain a composition satisfying the relation $1.1 \leq m+n \leq 1.7$ by causing the Q unit to occur.

The mole ratio n/m between the univalent aliphatic hydrocarbon group $R^1$ containing 1 to 4 carbon atoms and the univalent aromatic hydrocarbon group $R^2$ containing 6 to 24 carbon atoms is within the range of $0.4 \leq n/m \leq 2.5$. When n/m is less than 0.4, the univalent aliphatic hydrocarbon group $R^1$ becomes abundant within the molecule and, on that occasion, the heat resistance of the aromatic group-containing organosiloxane compound decreases, so that compounds occurring as liquids at room temperature may easily be obtained, and/or the flame retardancy of the aromatic group-containing organosiloxane compound itself lowers, thus decreasing the flame retardant effects of the aromatic group-containing organosiloxane compound may be caused. When n/m is not less than 2.5, the univalent aromatic hydrocarbon group $R^2$ becomes abundant within the molecule and, on that occasion, the heat resistance of the aromatic group-containing organosiloxane compound will be excessively improved, so that compounds occurring as solids at 200° C. or as liquids having a very high viscosity may be obtained, thus decreasing flame retardant effects of the aromatic group-containing organosiloxane compound may be caused. The value of n/m is preferably $0.43 \leq n/m \leq 2.3$, more preferably $0.45 \leq n/m \leq 2.1$, still more preferably $0.47 \leq n/m \leq 2.0$.

Further, the value of n/m generally causes a change in the dispersibility of the aromatic group-containing organosiloxane compound in resins. Although the value of n/m for obtaining the optimum dispersibility may vary according to the resin species, the dispersibility of the aromatic group-containing organosiloxane compound can be improved and high flame retardant effects can be obtained by selecting a higher value of n/m within the above range when the proportion of aromatic rings occurring in the resin employed is large, or by selecting a lower value of n/m within the above range when the proportion of aromatic rings occurring in the resin is small.

(2) That it does not flow at 23° C. is important in attaining good and uniform dispersibility of the aromatic group-containing organosiloxane compound in a resin when the aromatic group-containing organosiloxane compound is admixed with the resin. If it flows at 23° C., the aromatic group-containing organosiloxane compound will hardly occur uniformly in the resin or will be unevenly distributed or a continuous organosiloxane phase may occur, so that the flame retardancy of the composition obtained will be deteriorated. The term "flows" means that this compound occurs as a liquid at the given temperature. According to the composition and/or molecular weight of this compound, it is difficult in some cases to judge as to whether this compound is a liquid or a solid. In cases where it is difficult to judge as to whether it is a liquid or a solid, the judgment based on the following judgment criterion is employed. Thus, 10 g of this sample is taken and finely ground to thereby prepare a powder form so that all particles may have a particle diameter of not more than 1 mm. This powder is maintained at the temperature for fluidity judgment in a glass container, and after 10 minutes of standing, the state of this compound is again observed. When the whole amount of this compound is found as a state of coalescent and fixed, the judgment "flows" was given. It is more preferred that the compound be a solid having no tackiness at 23° C.

As the general method of obtaining the aromatic group-containing organosiloxane compound as a compound not flowing at 23° C., there may be mentioned the method which comprises selecting the mole ratio m+n between all hydrocarbon groups and Si atoms at a lower level within the range of $1.1 \leq m+n \leq 1.7$, the method which comprises selecting the mole ratio n/m between the univalent aliphatic hydrocarbon group $R^1$ containing 1 to 4 carbon atoms and the univalent aromatic hydrocarbon group $R^2$ containing 6 to 24 carbon atoms at a higher level within the range of $0.4 \leq n/m \leq 2.5$ and the method which comprises selecting the molecular weight of the aromatic group-containing organosiloxane compound at a level as high as possible within the preferred range.

(3) The aromatic group-containing organosiloxane compound is a compound flowing at 200° C. Those organosiloxane compounds which will not flow at 200° C. have almost no substantial flame retardant effects. For obtaining good flame retardancy, the compound preferably flows at not lower than 170° C., more preferably flows at not lower than 150° C. Furthermore, it is preferred that the compound has a low melt viscosity as measured at 200° C., since then the flame retardancy is improved. The viscosity measured at 200° C. is preferably not more than 1,000,000 cSt, more preferably not more than 100,000 cSt, most preferably not more than 10,000 cSt.

As the general method of obtaining the aromatic group-containing organosiloxane compound as a compound flowing at 200° C., there may be mentioned the method which comprises selecting the mole ratio m+n between all hydrocarbon groups and Si atoms at a higher level within the range of $1.1 \leq m+n \leq 1.7$, the method which comprises selecting the mole ratio n/m between the univalent aliphatic hydrocarbon group $R^1$ containing 1 to 4 carbon atoms and the univalent aromatic hydrocarbon group $R^2$ containing 6 to 24 carbon atoms at a lower level within the range of $0.4 \leq n/m \leq 2.5$ and the method which comprises selecting the molecular weight of the aromatic group-containing organosiloxane compound at a level as low as possible within the range mentioned later herein.

(4) The aromatic group-containing organosiloxane compound is a compound which will not gelate when heated at 200° C. with stirring for 30 minutes. Those organosiloxane compounds which gelate in less than 30 minutes when heated at 200° C. with stirring have almost no flame retardant effects. It is preferred that the compound will not gelate when heated at 200° C. with stirring for 60 minutes and it is more preferred that it will not gelate when heated at 200° C. with stirring for 120 minutes. The judgment about "gelation" is made in the following manner. The 200 g of powdery sample being stirred at the temperature for gelation judgment under vacuum for the designated period followed by being cooled to 23° C. and ground is placed in 1 L of toluene at 23° C. and after 24 hours of stirring at 23° C., the insoluble matter was filtered off. The filtered component is dried under vacuum at 23° C. for 6 hours and then weighed. When the weight of the insoluble matter is not less than 100 g, it is judged as gelated. If, however, an acidic or alkaline compound, a catalyst decomposing silicones and the like are coexist in the step of heating and stirring, even a preferred aromatic group-containing organosiloxane compound may gelate in some cases. Therefore, it is necessary to carry out this test under conditions substantially free of such impurities.

As the general method of obtaining the aromatic group-containing organosiloxane compound as one which will not gelate when heated at 200° C. with stirring for 30 minutes, there may be mentioned the method which comprises reducing, as far as possible, the amount of reactive groups occurring within the molecule of the aromatic group-containing organosiloxane compound. The reactive groups mentioned above include such condensable groups as silanol and alkoxysilyl groups. When the reactive groups are present within the molecule, these reactive groups react with one another in the step of heating and stirring, thus tending to cause gelation.

(5) The aromatic group-containing organosiloxane compound is a compound which has a number average molecular weight of not less than 2,000 and at the same time, dissolves not less than 100 g in 1 L of a solvent toluene at 23° C. The number average molecular weight so referred to herein is the value obtained by converting the measured value as measured by using a conventional GPC molecular weight measuring apparatus with chloroform as the solvent and an RI detector to a value based on the measured value for a polystyrene species having a known molecular weight. Excessively high or excessively low number average molecular weights are not preferred. If the number average molecular weight is less than 2,000, the heat stability of the aromatic group-containing organosiloxane compound itself decreases, hence the flame retardancy decreases. The solubility in solvents of the aromatic group-containing organosiloxane compound lowers as the molecular weight increases. In order to provide resins with flame retardancy, the aromatic group-containing organosiloxane compound is required to have a solubility of not less than 100 g in 1 L of a solvent toluene at 23° C. Those high-molecular weight ones which are insoluble in solvents show almost no flame retardancy when added to the resin. The number average molecular weight is preferably within the range of 2,400 to 50,000, more preferably 2,700 to 10,000, still more preferably 2,900 to 7,000.

Such aromatic group-containing organosiloxane compound can be synthesized easily by a known silicone synthesizing method. Thus, it can be synthesized by subjecting at least one, preferably at least two silicon compounds selected, according to need, from among monofunctional silicon compounds represented by $R_3SiX$, bifunctional silicon compounds represented by $R_2SiX_2$, trifunctional silicon compounds represented by $RSiX_3$ and tetrafunctional silicon compounds such as silicon tetrahalides, tetraalkoxysilanes, water glass and metal silicates to condensation reaction. In the formulas, R represents an aromatic hydrocarbon group or an aliphatic hydrocarbon group, and X represents a group capable of forming a siloxane bond upon condensation, such as a halogen, a hydroxyl group or an alkoxy group.

The reaction conditions vary according to the substrate to be employed and the composition and molecular weight of the desired compound. Generally, the reaction can be carried out by mixing the silicon compounds, if necessary in the presence of water, an acid and/or an organic solvent, if necessary with heating. The proportions of the respective silicon compounds to be used can appropriately be selected taking into consideration the contents of the respective units and the ratio between the aromatic hydrocarbon group and the aliphatic hydrocarbon group so that the aromatic group-containing organosiloxane compound to be obtained may meet the requirements mentioned above. For reducing the amount of reactive groups occurred as far as possible, as mentioned above, it is preferable to add, after the above condensation reaction, a monofunctional silicon compound represented by $R_3SiX$ in excessive amount and conduct condensation reaction.

The resin (B) having an oxygen or sulfur atom and an aromatic ring within the molecule thereof, which is to be used in accordance with the present invention, may be a synthesized one or a natural resin. It may be any of a thermoplastic resin and a thermosetting resin. A thermoplastic resin is preferred since the flame retardancy of the flame retardant resin composition is improved.

As such resin, there are various species. Particularly suited are, for example, aromatic polycarbonate resins, aromatic polyester resins, polyarylate resins, aromatic polyamide resins, aromatic vinyl/alkyl (meth)acrylate copolymer resins, aromatic vinyl/maleic anhydride copolymer resins, aromatic vinyl/alkyl (meth)acrylate/rubber-like polymer copolymer resins, N-phenylmaleimide resins, polyphenylene ether resins, aromatic polyetherketone resins, aromatic polyketone resins, polyphenylene sulfide resins, phenolic resins, aromatic epoxy resins, aromatic phenoxy resins and the like. These resins having an oxygen or sulfur atom and an aromatic ring within the molecule thereof may be used singly or two or more species may be used in combination.

The resin may be the mixture of the resin having an oxygen or sulfur atom and an aromatic ring within the molecule thereof with another resin. The resin to be admixed with the resin having an oxygen or sulfur atom and an aromatic ring within the molecule thereof is not particularly restricted but various resins in general use can be used. In cases where the resin is the mixture of the resin having an oxygen or sulfur atom and an aromatic ring within the molecule thereof with another resin species, the mixing ration between them, namely the ratio (resin having an oxygen or sulfur atom and an aromatic ring within the molecule)/(other resins), is preferably not less than 0.3, more preferably not less than 0.5, still more preferably not less than 1.0.

The level of addition of the aromatic group-containing organosiloxane compound for attaining good flame retardancy is 0.2 to 20 parts by weight relative to 100 parts of the resin. The preferred level of addition is 0.3 to 15 parts by weight, more preferred level of addition is 0.5 to 10 parts by weight. If the level of addition is less than 0.2 part by weight, the composition obtained will not show a satisfactory level of flame retardancy. If the level of addition exceeds 20 parts by weight, the composition will generally become economically disadvantageous, although, in most cases, no problems arise from the physical characteristics viewpoint.

In the resin composition added with the flame retardant of the present invention, the aromatic group-containing organosiloxane compound is preferably dispersed, in the resin having an oxygen or sulfur atom and an aromatic ring within the molecule thereof, as particles having a number average dispersed particle diameter within the range of 0.01 $\mu$m to 0.5 $\mu$m. Owing to the fact that the aromatic group-containing organosiloxane compound has the structure such as mentioned hereinabove, it becomes possible to disperse the organosiloxane compound within such a range. By being dispersed in such a minute particle form, the compound can show very good flame retardancy. The number average dispersed particle diameter so referred to herein is the value calculated on the number average basis from the diameters of dispersed particles of the aromatic group-containing organosiloxane compound as calculated regarding the relative particles as circular upon observation, under a transmission electron microscope at a magnification of about 16,000 times, of approximately the middle portion in the direction of thickness of the molding having a thickness of 3.2 mm as molded from the resin composition obtained. The number average dispersed particle diameter is more preferably within the range of 0.02 $\mu$m to 0.4 $\mu$m, still more preferably within the range of 0.03 $\mu$m to 0.3 $\mu$m. The number average dispersed particle diameter is influenced by the level of addition of the aromatic group-containing organosiloxane compound and the dispersed particle diameter tends to increase with the increased level of addition thereof.

In the flame retardant resin composition of the present invention, there may be incorporated a fluororesin and/or a silicon-containing polymer other than the aromatic group-containing organosiloxane compound to be used according to the invention, for further increasing the flame retardancy.

The fluororesin is a resin containing a fluorine atom(s) therein. Specifically, there may be mentioned polymonofluoroethylene, polydifluoroethylene, polytrifluoroethylene, polytetrafluoroethylene, tetrafluoroethylene/hexafluoropropylene copolymers and the like. If necessary, copolymers obtained by copolymerizing a monomer(s) to be used in the production of the above fluororesins with another monomer copolymerizable therewith may also be used unless the flame retardancy and other physical properties of the moldings obtained are impaired. These fluororesins are used singly or in combination of two or more species. The fluororesins preferably have a molecular weight of 1,000,000 to 20,000,000, more preferably 2,000,000 to 10,000,000. As for the production method of these fluororesins, they can be obtained by such generally known methods as emulsion polymerization, suspension polymerization, bulk polymerization and solution polymerization.

The silicon-containing polymer other than the aromatic group-containing organosiloxane compound to be used in accordance with the present invention includes diorganosiloxane compounds such as dimethylsiloxane and phenylmethylsiloxane, organosilhemioxane compounds such as trimethylsilhemioxane and triphenylsilhemioxane, and copolymers obtainable by polymerizing these, polydimethylsiloxane, polyphenylmethylsiloxane, polysilanes, polycarbosilanes, polysilazanes, silicon-boron copolymers, silicon-metal copolymers and so on. Modified silicon polymers derived by substitution of epoxy, hydroxyl, carboxyl, mercapto or amino group, ether or the like in part of the molecule may also be used. Among others, the polymer is preferably one having a number average molecular weight not less than 200, more preferably having a number average molecular weight within the range of 1,000 to 5,000,000 since such polymer can more improve the flame retardancy. The form of the silicone is not particularly restricted but any arbitrary form such as an oil, gum, wax, powder or pellets can be utilized. Among them, silicon-boron copolymers are preferred since they are effective in markedly increasing the flame retardant effects.

The level of addition of the fluororesin and/or silicon-containing polymer is not particularly restricted unless the characteristics (chemical resistance, heat resistance, etc.) attainable in accordance with the present invention are not impaired. Preferably, however, it is 0.01 to 10 parts by weight, more preferably 0.03 to 8 parts by weight, particularly preferably 0.05 to 6 parts by weight, relative to 100 parts by weight of the resin (B). If the level of addition is below 0.01, the effect of improving flame retardancy will be slight and, If it exceeds 10 parts by weight, the moldability may decrease in some instances.

For obtaining the flame retardant resin composition of the present invention as a composition of higher performance, one or a combination of two or more of heat stabilizers, such as phenolic stabilizers, thioether stabilizers and phosphorus-containing stabilizers, is preferably used. Further, according to need, one or a combination of two or more of generally well-known additives such as lubricants, mold release agents, plasticizers, flame retardants, flame retardant auxiliaries, ultraviolet absorbers, light stabilizers, pigments, dyes, antistatic agents, conductivity providing agents, dispersants, compatibilizing agents and antimicrobial agents may be used. However, when, as such additives, ones capable of promoting the decomposition or reaction of the aromatic group-containing organosiloxane compound is used, the flame retardancy of the resulting composition will decrease. So, the use of such compounds is not preferred.

The production method of the composition of the present invention is not particularly restricted. For example, it can be produced by melt kneading the above components together with the other additive(s), resin(s) and so forth, if necessary after drying, in a melt kneading machine such as a single screw or twin screw extruder. For dispersing the aromatic group-containing organosiloxane compound within the number average dispersed particle diameter range of 0.01 $\mu$m to 0.5 $\mu$m in the resin, it can be produced by the method comprising kneading while exerting a shear force in the molten state with the use of a melt kneading machine, specifically, as a twin screw extruder.

The method of molding the flame retardant resin composition produced according to the present invention is not particularly restricted but those molding techniques in general use, for example injection molding, blow molding, extrusion molding, vacuum molding, press molding, calendaring, foam molding and other techniques, can be applied.

The flame retardant resin composition of the present invention is suitably used in various uses. Preferred fields of use include household electric appliances, OA equipment, automotive parts and other injection-molded articles, blow-molded articles, extrusion-molded articles, expansion-molded articles and so forth.

BEST MODES FOR CARRYING OUT THE INVENTION

Figure 1:
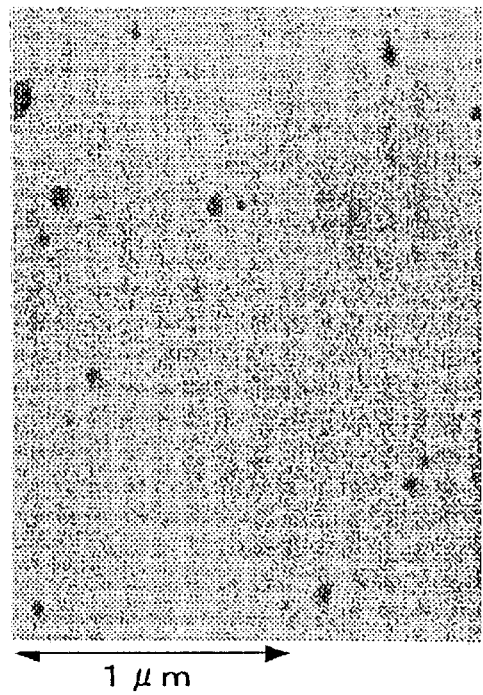
FIG. 1 is a transmission electron photomicrograph of the section of a bar obtained from the composition of Example 1.

The following examples illustrate the present invention in more detail. They are, however, by no means limitative of the scope of the present invention. In the following, unless otherwise specified, "part(s)" denotes "part(s) by weight" and "%" denotes "% by weight".

The resin compositions were evaluated by the following methods.

The aromatic group-containing organosiloxane compound was analyzed using the following methods.

Mean Composition Formula:

The sample was dissolved in deuteriochloroform as the solvent and the proportions of hydrogen, carbon and silicon were calculated based on the NMR data.

Fluidity:

When the compound evidently occurred as a liquid at 23° C. or 200° C., it was regarded as "fluid". When it was difficult to judge as to whether the compound occurred as a liquid or a solid at each temperature, the following procedure was followed for judgment. Thus, 10 g of each sample was taken and finely ground to thereby prepare a powder form so that all particles may have a particle diameter of not larger than 1 mm. This powder was maintained at the temperature for fluidity judgment in a glass container and, after 10 minutes of standing, the state of this compound was again observed. When the whole amount of this compound was found as a state of coalescent and fixed, the judgment "fluid" was given. When this compound remained in a powdery form or found partially fixed but the whole sample was not found coalescent, the judgment "nonfluid" was given.

Solubility in 1 L of Toluene at 23° C.:

Into 1 L of toluene was poured 200 g of the sample in powder form after 6 hours of drying at 23° C. under vacuum and, after 24 hours of stirring at 23° C., the insoluble matter was filtered off. The component filtered off was dried at 23° C. under vacuum for 6 hours and then weighed. The solubility was calculated according to the formula 200—(insoluble matter weight). For the samples which gave no insoluble matter at all, the solubility was reported as >200 g.

Gelation at 200° C.:

The 200 g of the powdery sample being stirred at 200° C. under vacuum for 30 minutes followed by being cooled to 23° C. and ground was placed in 1 L of toluene at 23° C. and, after 24 hours of stirring at 23° C., the insoluble matter was filtered off. The component filtered off was dried at 23° C. under vacuum for 6 hours and then weighed. When the weight of the insoluble matter was not less than 100 g, the judgment "gelation" was given. For the samples not given the judgment "gelation" in the above examination, the same test was performed by prolonging the time of heating at 200° C. to 60 minutes and then to 120 minutes successively. When gelation occurred after 60 minutes of stirring, the judgment "gelation after 60 minutes" was given and, when gelation occurred after 120 minutes of stirring, the judgment "gelation after 120 minutes" was given. The samples showing no gelation even after 120 minutes of stirring were given the judgment "nogelation". When the solubility was found not more than 100 g in the test for "solubility in 1 L of toluene at 23° C.", this test was not performed.

Number Average Molecular Weight:

The number average molecular weight was calculated after performing detection with RI detector under the following conditions: Waters model 510 type GPC system, column: Shodex K-80M, K-802.5, column temperature 35° C., mobile phase: chloroform (for HPLC; product of Wako Pure Chemical), flow rate: 1 mL/min, injection size: 50 μL (about 0.3 wt %), standard sample; polystyrene (Shodex Standard; product of Showa Denko) At the same time, the weight average molecular weight was also calculated, and the molecular weight distribution was calculated according to the formula (weight average molecular weight)/(number average molecular weight). When a sample was insoluble in the chloroform solvent, the above analysis was not performed but only the evaluation of measuring solubility in toluene at 23° C. was carried out.

PRODUCTION EXAMPLE 1

Production of an Aromatic Group-containing Organosiloxane Compound (A1)

Tetrachiorosilane (1.0 part), 12.0 parts of methyltrichlorosilane, 64.0 parts of phenyltrichlorosilane and 200 parts of methyl isobutyl ketone as solvent were charged into a reaction vessel with ice cooling, and 75 parts of ion-exchange water was added gradually with stirring over 6 hours while adjusting the temperature within the range of 0 to 10° C. After completion of the addition, the mixture was stirred at room temperature for 12 hours and, then, 23.0 parts of trimethylchlorosilane was added dropwise at room temperature. The mixture was stirred at room temperature for 12 hours. The mixture was washed with water until the washings of the resin became neutral. The organic phase separated was deprived of the solvent and low-molecular byproducts by evaporation, to give an aromatic group-containing organosiloxane compound (A1) as a solid.

PRODUCTION EXAMPLE 2

Production of an Aromatic Group-containing Organosiloxane Compound (A2)

A reaction vessel was charged with 1.16 moles of phenyltrimethoxysilane, 0.58 mole of tetraethoxysilane, 4.93 moles of pure water and 40 ppm of 35% hydrochloric acid, and the mixture was stirred at 23° C. for 1 hour, then at 40° C. for 1 hour and finally at 60° C. for 1 hour. Thereafter, the temperature was raised to 95° C., and the mixture was heated while removing the alcohol out of the system until the alcohol generation ceased. The resin obtained was dissolved in methyl isobutyl ketone and the solution was stirred at room temperature for 1 day. Then, 0.83 mole of trimethylchlorosilane was added dropwise, followed by 1 hour of heating at 60° C. The mixture was washed with water until the washings of the resin became neutral. The organic phase separated was deprived of the solvent and low-molecular byproducts by evaporation to give an aromatic group-containing organosiloxane compound (A2) as a solid.

PRODUCTION EXAMPLE 3

Production of an Aromatic Group-containing Organosiloxane Compound (A3)

A reaction vessel was charged with 1.0 mole of diphenyldimethoxysilane, 5.1 moles of pure water and 400 ppm of 35% hydrochloric acid, and the mixture was stirred at 60° C. for 3 hours. Then, 1.0 mole of tetraethoxysilane was added dropwise at 60° C. Thereafter, while removing the alcohol out of the system at 90° C., the temperature was raised to 120° C. and the mixture was heated until alcohol generation was ceased. After cessation of the alcohol generation, the mixture was stirred at 140° C. for 2 hours. The resin obtained was dissolved in methyl isobutyl ketone, the solution was stirred at room temperature for 1 day, 1.5 moles of trimethylchlorosilane was then added dropwise, and the mixture was heated at 60° C. for 1 hour. The mixture was washed with water until the washings of the resin became neutral, the organic phase separated was deprived of the solvent and low-molecular byproducts by evaporation to give an aromatic group-containing organosiloxane compound (A3) as a solid.

PRODUCTION EXAMPLE 4

Production of an Aromatic Group-containing Organosiloxane Compound (A4)

An aromatic group-containing organosiloxane compound (A4) was obtained as a solid in the same manner as in Production Example 1 except that 0.5 part of tetrachlorosilane, 21.5 parts of methyltrichlorosilane, 62.0 parts of phenyltrichlorosilane, 260 parts of methyl isobutyl ketone as solvent, 70 parts of ion-exchange water and 16.0 parts of trimethylchlorosilane were used.

REFERENCE PRODUCTION EXAMPLE 1

Production of an Aromatic Group-containing Organosiloxane Compound (A'1)

A reaction vessel was charged with 1.0 part of tetrachlorosilane, 22.0 parts of methyltrichlorosilane, 62.0 parts of phenyltrichlorosilane and 180 parts of methyl isobutyl ketone as solvent with ice cooling, and 45 parts of ion-exchange water was added with stirring over 0.5 hour while adjusting the temperature within the range of 0 to 30° C. After completion of the addition, a gel-like matter insoluble in the solvent formed. After 12 hours of stirring at room temperature, 15.0 parts of trimethylchlorosilane was added dropwise at room temperature and the mixture was stirred at room temperature for 12 hours. The mixture was washed with water until the washings of the resin became neutral, followed by filtration and drying under vacuum to give an aromatic group-containing organosiloxane compound (A'1) as a solid.

REFERENCE PRODUCTION EXAMPLE 2

Production of an Aromatic Group-containing Organosiloxane Compound (A'2)

A reaction vessel was charged with 15.0 parts of methyltrichlorosilane, 80.0 parts of phenyltrichlorosilane and 180 parts of methyl isobutyl ketone as solvent with ice cooling, and 75 parts of ion-exchange water was added gradually with stirring over 1 hour while adjusting the temperature within the range of 0 to 20° C. After completion of the addition, the mixture was stirred at 60° C. for 4 hours and then at room temperature for 12 hours, 5.0 parts of trimethylchlorosilane was added dropwise at room temperature and the mixture was stirred at room temperature for 12 hours. The mixture was washed with water until the washings of the resin became neutral, and the organic phase separated was deprived of the solvent and low-molecular byproducts by evaporation to give an aromatic group-containing organosiloxane compound (A'2) as a solid.

REFERENCE PRODUCTION EXAMPLE 3

Production of an Aromatic Group-containing Organosiloxane Compound (A'3)

A reaction vessel was charged with 85 parts of ion-exchange water and 250 parts of methyl isobutyl ketone as solvent with ice cooling and then 33.0 parts of methyltrichlorosilane and 51.0 parts of phenyltrichlorosilane were added gradually with stirring over 8 hours while adjusting the temperature within the range of 0 to 5° C. After completion of the addition, 16.0 parts of trimethylchlorosilane was added dropwise at room temperature and the mixture was stirred at room temperature for 12 hours. The mixture was washed with water until the washings of the resin became neutral. The organic phase separated was deprived of the solvent and low-molecular byproducts by evaporation to give an aromatic group-containing organosiloxane compound (A'3) as a solid.

REFERENCE PRODUCTION EXAMPLE 4

Production of an Aromatic Group-containing Organosiloxane Compound (A'4)

A reaction vessel was charged with 1.5 moles of tetraethoxysilane, 3.0 moles of pure water, 3.0 moles of methanol and 40 ppm of 35% hydrochloric acid, and the reaction was carried out in the same manner as in Production Example 2 and the resin was dissolved in the solvent as in Production Example 2. Thereafter, the same procedure of as in Production Example 2 was followed except that 2.0 moles of dimethylphenylchlorosilane was added dropwise to give an aromatic group-containing organosiloxane compound (A'4) as a solid.

REFERENCE PRODUCTION EXAMPLE 5

Production of an Aromatic Group-containing Organosiloxane Compound (A'5)

An aromatic group-containing organosiloxane compound (A'5) was obtained as a solid in the same manner as in Production Example 1 except that 31.0 parts of methyltrichlorosilane, 36.0 parts of phenyltrichlorosilane, 10.0 parts of diphenyldichlorosilane, 180 parts of methyl isobutyl ketone as solvent, 75 parts of ion-exchange water and 23.0 parts of trimethylchlorosilane were used.

REFERENCE PRODUCTION EXAMPLE 6

Production of an Aromatic Group-containing Organosiloxane Compound (A'6)

An aromatic group-containing organosiloxane compound (A'6) was obtained as a solid in the same manner as in Reference Production Example 3 except that 120 parts of ion-exchange water, 300 parts of methyl isobutyl ketone as solvent, 0.5 part of tetrachlorosilane, 64.0 parts of methyltrichlorosilane, 15.5 parts of phenyltrichlorosilane, and 20.0 parts of trimethylchlorosilane were used.

REFERENCE PRODUCTION EXAMPLE 7

Production of an Aromatic Group-containing Organosiloxane Compound (A'7)

An aromatic group-containing organosiloxane compound (A'7) was obtained as a solid in the same manner as in Production Example 1 except that 5.0 parts of tetrachlorosilane, 65.0 parts of phenyltrichlorosilane, 200 parts of methyl isobutyl ketone as solvent, 75 parts of ion-exchange water and 30.0 parts of dimethylphenylchlorosilane were used.

The results of analysis of each aromatic group-containing organosiloxane compound are shown in Table 1, and the silane compounds used in the synthesis are shown in Table 2.

TABLE 1

| Sample name | m + n | n/m | Number average mol. wt. (Mn) | Mol. wt. distribution (Mw/Mn) | Fluidity at 23° C. | Fluidity at 200° C. | Solubility in 1 L of toluene | Gelation at 200° C. |
|---|---|---|---|---|---|---|---|---|
| A1 | 1.24 | 1.27 | 3440 | 1.67 | Nonfluid | Fluid | >200 g | No gelation |
| A2 | 1.53 | 0.47 | 3030 | 1.46 | Nonfluid | Fluid | >200 g | No gelation |
| A3 | 1.47 | 1.08 | 4880 | 4.38 | Nonfluid | Fluid | >200 g | No gelation |
| A4 | 1.31 | 0.75 | 4410 | 4.28 | Nonfluid | Fluid | >200 g | No gelation |
| A'1 | Unmeasurable | Unmeasurable | Unmeasurable | Unmeasurable | Nonfluid | Nonfluid | 1.5 g | Not tested |
| A'2 | 1.33 | 1.22 | 5380 | 9.29 | Nonfluid | Fluid | >200 g | Gelation |
| A'3 | 1.37 | 0.45 | 2520 | 1.33 | Fluid | Fluid | >200 g | No gelation |
| A'4 | 1.08 | 0.5 | 5750 | 13.5 | Nonfluid | Fluid | >200 g | No gelation |
| A'5 | 1.75 | 0.61 | 6820 | 10.87 | Nonfluid | Fluid | >200 g | No gelation |
| A'6 | 1.23 | 0.12 | 3450 | 2.32 | Nonfluid | Fluid | >200 g | No gelation |
| A'7 | 1.19 | 2.55 | 5010 | 4.67 | Nonfluid | Fluid | >200 g | No gelation |

In Table 1, "unmeasurable" means that the sample was not dissolved in chloroform, so that each analysis could not be carried out.

TABLE 2

| Sample name | Silane compound used in synthesis |
|---|---|
| A1 | Tetrachlorosilane, phenyltrichlorosilane, methltrichlorosilane, trimethylchlorosilane |
| A2 | Tetraethoxysilane, phenyltrimethoxysilane, trimethylchlorosilane |
| A3 | Tetraethoxysilane, diphenyldimethoxysilane, trimethylchlorosilane |
| A4 | Tetrachlorosilane, phenyltrichlorosilane, methyltrichlorosilane, trimethylchlorosilane |

TABLE 2-continued

| Sample name | Silane compound used in synthesis |
|---|---|
| A'1 | Tetrachlorosilane, phenyltrichlorosilane, methyltrichlorosilane, trimethylchlorosilane |
| A'2 | Phenyltrichlorosilane, methyltrichlorosilane, trimethylchlorosilane |
| A'3 | Phenyltrichlorosilane, methyltrichlorosilane, trimethylchlorosilane |
| A'4 | Tetraethoxysilane, dimethylphenylchlorosilane |
| A'5 | Phenyltrichlorosilane, methyltrichlorosilane, diphenyldichlorosilane, trimethylchlorosilane |
| A'6 | Tetrachlorosilane, phenyltrichlorosilane, methyltrichlorosilane, trimethylchlorosilane |
| A'7 | Tetrachlorosilane, phenyltrichlorosilane, dimethylphenylchlorosilane |

EXAMPLE 1

An aromatic bisphenol A-type polycarbonate (TARFLON A-2200; product of Idemitsu Petrochemcial; 100 parts), 3 parts of the aromatic group-containing organosiloxane compound (A1) produced in Production Example 1, 0.3 part of a tetrafluoroethylene (POLYFLON FA-500; product of Daikin Industries), 0.1 part of a phenolic stabilizer (ADK STAB AO-60; product of Asahi Denka Kogyo) and 0.1 part of a phosphite stabilizer (ADK STAB HP-10; product of Asahi Denka Kogyo) were blended, and the raw material mixture was charged into the hopper of a unidirectional twin-screw extruder with a tip temperature maintained at 280° C. and melt-kneaded to give a resin composition.

EXAMPLES 2 TO 6 AND COMPARATIVE EXAMPLES 1 TO 7

Resin compositions were prepared in the same manner as in Example 1. The resin(s) and aromatic group-containing organosiloxane compound used were varied as shown in Table 3.

The resins used were as follows:

PET: Polyethylene terephthalate resin with a logarithmic viscosity of 0.70.

PPE: Poly(2, 6-dimethyl-1,4-phenylene) ether resin with a logarithmic viscosity of 0.50.

HIPS: Styrene-butadiene copolymer (Estyrene HI H-65; product of Nippon Steel Chemical).

ABS: Styrene-acrylonitrile-butadiene copolymer (Kaneka MUH 85000H; product of Kaneka Corporation).

Evaluation Method 1: Flame Retardancy

Bars, 1.6 mm thick, 12.7 mm wide and 127 mm long, were prepared from the pellets obtained and evaluated for flame retardancy of bars with 1.6 mm thick according to the UL-94 V standard.

Evaluation Method 2: Dispersed Particle Diameter

Bars, 3.2 mm thick, 12.7 mm wide and 127 mm long, were prepared from the pellets obtained, and were sliced from the middle portion thereof in the direction of thickness, the section thereof was observed under a transmission electron microscope and the number average dispersed particle diameter was calculated by image processing.

The evaluation results are shown in Table 3.

TABLE 3

| | | Resin | | | | | Organosiloxane compound | | UL94 | Dispersed particle diameter |
| | | PC | PET | PPE | HIPS | ABS | Sample name | Addition level | Judgement | ($\mu$m) |
|---|---|---|---|---|---|---|---|---|---|---|
| Example | 1 | 100 | — | — | — | — | A1 | 3 | V—O | 0.11 |
| | 2 | 80 | 20 | — | — | — | A1 | 3 | V—O | 0.12 |
| | 3 | 90 | 10 | — | — | — | A2 | 3 | V—O | 0.25 |
| | 4 | 90 | 10 | — | — | — | A3 | 3 | V—O | 0.22 |
| | 5 | 90 | 10 | — | — | — | A4 | 3 | V—O | 0.16 |
| | 6 | — | — | 90 | 10 | — | A1 | 6 | V—O | 0.27 |
| | 7 | 90 | — | — | — | 10 | A1 | 6 | V—O | 0.26 |
| Compar. Ex. | 1 | 100 | — | — | — | — | A'1 | 3 | off-grade | 2.41 |
| | 2 | 90 | 10 | — | — | — | A'3 | 3 | off-grade | 0.55 |
| | 3 | 90 | 10 | — | — | — | A'4 | 3 | off-grade | 0.09 |
| | 4 | 90 | 10 | — | — | — | A'5 | 3 | off-grade | 0.42 |
| | 5 | 90 | 10 | — | — | — | A'6 | 3 | off-grade | 0.33 |
| | 6 | 100 | — | — | — | — | A'6 | 3 | off-grade | 0.52 |
| | 7 | 90 | 10 | — | — | — | A'7 | 3 | off-grade | 0.17 |

Figure 2:
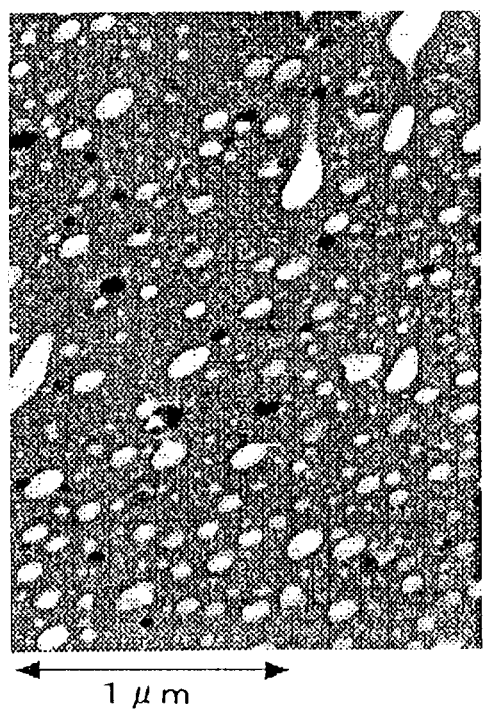
FIG. 2 is a transmission electron photomicrograph of the section of a bar obtained from the composition of Example 2.
Figure 3:
FIG. 3 is a transmission electron photomicrograph of the section of a bar obtained from the composition of Comparative Example 1.
Figure 4:
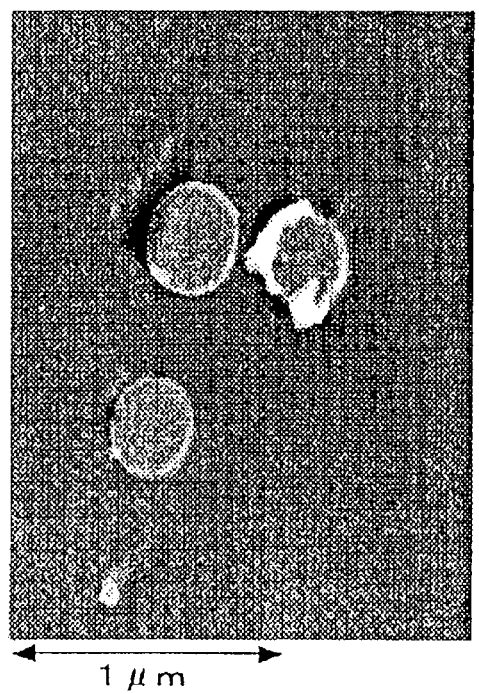
FIG. 4 is a transmission electron photomicrograph of the section of a bar obtained from the composition of Comparative Example 6.

The transmission electron photomicrograph obtained in Example 1 is attached hereto as FIG. 1, the transmission electron photomicrograph obtained in Example 2 as FIG. 2, the transmission electron photomicrograph obtained in Comparative Example 1 as FIG. 3, and the transmission electron photomicrograph obtained in Comparative Example 6 as FIG. 4. In FIG. 1, the aromatic group-containing organosiloxane compound A1 is seen dispersed as deep black spots in the gray PC. In FIG. 2, the aromatic group-containing organosiloxane compound A1 is seen dispersed as deep black spots and the PET as white spots in the gray PC. In FIG. 3, the aromatic group-containing organosiloxane compound A'1 is seen dispersed as dense spots in the gray PC. In FIG. 4, the aromatic group-containing organosiloxane compound A'6 is seen dispersed as pale gray spots in the gray PC.

As is evident from Table 3, good flame retardancy was obtained in all Examples in which the flame retardant according to the present invention was used whereas, in the Comparative Examples in which the flame retardant used was outside the scope of the present invention, the flame retardancy was poor in any case. In all Examples, each aromatic group-containing organosiloxane compound was finely dispersed whereas, in the Comparative Examples, the dispersed particle diameter was too large or too small.

INDUSTRIAL APPLICABILITY

As shown hereinabove, it is seen that the resin composition in which the flame retardant of the present invention is used can provide good flame retardancy as a result of mere addition of a small amount of the aromatic group-containing organosiloxane compound without using any halogen compound or phosphorus compound. These are industrially very useful.

What is claimed is:

1. A flame retardant comprising:
   an aromatic group-containing organosiloxane compound having the mean composition formula $R^1_m R^2_n SiO(4-m-n)/2$ in which
   $R^1$ represents a univalent aliphatic hydrocarbon group containing 1 to 4 carbon atoms,
   $R^2$ represents a univalent aromatic hydrocarbon group containing 6 to 24 carbon atoms,
   $R^1$ and $R^2$ each may contain two or more species, and m and n are numbers satisfying the mathematical relationships $1.1 \leq m+n \leq 1.7$ and $0.4 \leq n/m \leq 2.5$,
   wherein the aromatic group-containing organosiloxane compound comprises Q unit ($SiO_2$) as an essential unit or consists of M unit ($R_3SiO_{0.5}$) and T unit ($RSiO_{1.5}$);
   said compound being non-flowable at 23° C., flowable at 200° C., non-gelatable when at 200° C. and stirred for 30 minutes; and
   said compound having a number average molecular weight of not less than 2,000 and being dissolvable in an amount of not less than 100 g in one liter of a toluene solvent at a temperature of 23° C.

2. The flame retardant according to claim 1, wherein the aromatic group-containing organosiloxane compound comprises Q unit ($SiO_2$) as an essential unit and at least one member selected from the group consisting of M unit ($R_3SiO_{0.5}$), D unit ($R_2SiO$) and T unit ($RSiO_{1.5}$).

3. A flame retardant resin composition which comprises 0.2 to 20 parts by weight of the flame retardant (A) comprising an aromatic group-containing organosiloxane compound according to claim 1 relative to 100 parts by weight of a resin (B) having an oxygen or sulfur atom and an aromatic ring within the molecule thereof.

4. The flame retardant resin composition according to claim 3,
   wherein the aromatic group-containing organosiloxane compound (A) is dispersed with the number average dispersed particle diameter within the range of 0.01 $\mu$m to 0.5 $\mu$m in the resin (B) having an oxygen or sulfur atom and an aromatic ring within the molecule thereof.

* * * * *